United States Patent
Hudson et al.

(10) Patent No.: US 7,875,862 B1
(45) Date of Patent: Jan. 25, 2011

(54) ULTRAVIOLET PLANT ERADICATION APPARATUS AND METHOD

(76) Inventors: Jerry Wade Hudson, 2608 SW. 120th St., Oklahoma City, OK (US) 73170-4735; Virginia Hudson, 2608 SW. 120th St., Oklahoma City, OK (US) 73170-4735; Michael J. O'Toole, 2687 Carrollton Rd., Annapolis, MD (US) 21403

(*) Notice: Subject to any disclaimer, the term of this patent is extended or adjusted under 35 U.S.C. 154(b) by 490 days.

(21) Appl. No.: 11/999,753

(22) Filed: Dec. 7, 2007

(51) Int. Cl.
*A61N 5/00* (2006.01)
(52) U.S. Cl. .................................................. 250/492.1
(58) Field of Classification Search ............ 250/492.1, 250/504 R; 47/65
See application file for complete search history.

(56) References Cited

U.S. PATENT DOCUMENTS

| | | | |
|---|---|---|---|
| 4,518,663 A * | 5/1985 | Kodali et al. ................ | 429/18 |
| 5,040,329 A * | 8/1991 | Michaloski ................ | 47/65 |
| 5,071,416 A | 12/1991 | Heller | |
| 5,106,637 A | 4/1992 | Forwood | |
| 5,231,401 A * | 7/1993 | Kaman et al. ............ | 342/55 |
| 5,916,788 A | 6/1999 | Kubota | |
| 6,172,328 B1 | 1/2001 | Jones | |
| 6,180,914 B1 | 1/2001 | Jones | |
| 6,574,363 B1 | 6/2003 | Classen | |
| 6,653,971 B1 | 11/2003 | Guice | |
| 6,673,067 B1 | 1/2004 | Peyman | |
| 7,118,562 B2 | 10/2006 | Furumoto | |
| 2005/0210744 A1 | 9/2005 | Watanabe | |

\* cited by examiner

*Primary Examiner*—Kiet T Nguyen
(74) *Attorney, Agent, or Firm*—Randal D. Homburg

(57) ABSTRACT

An ultraviolet plant eradication system providing an ultraviolet radiation beam delivered by at least one ultraviolet laser dispersing a selected bandwidth of ultraviolet radiation to an area containing certain specific plants in a pattern, projects the ultraviolet laser radiation beam into the ground area containing plants, the adjustable bandwidth of the ultraviolet radiation determined by the specific bandwidth optimally adapted to disrupt the cellular structure of the selected plant to be exterminated by the ultraviolet radiation, the system being applied by either a ground delivered vehicle or an airborne vehicle.

7 Claims, 3 Drawing Sheets

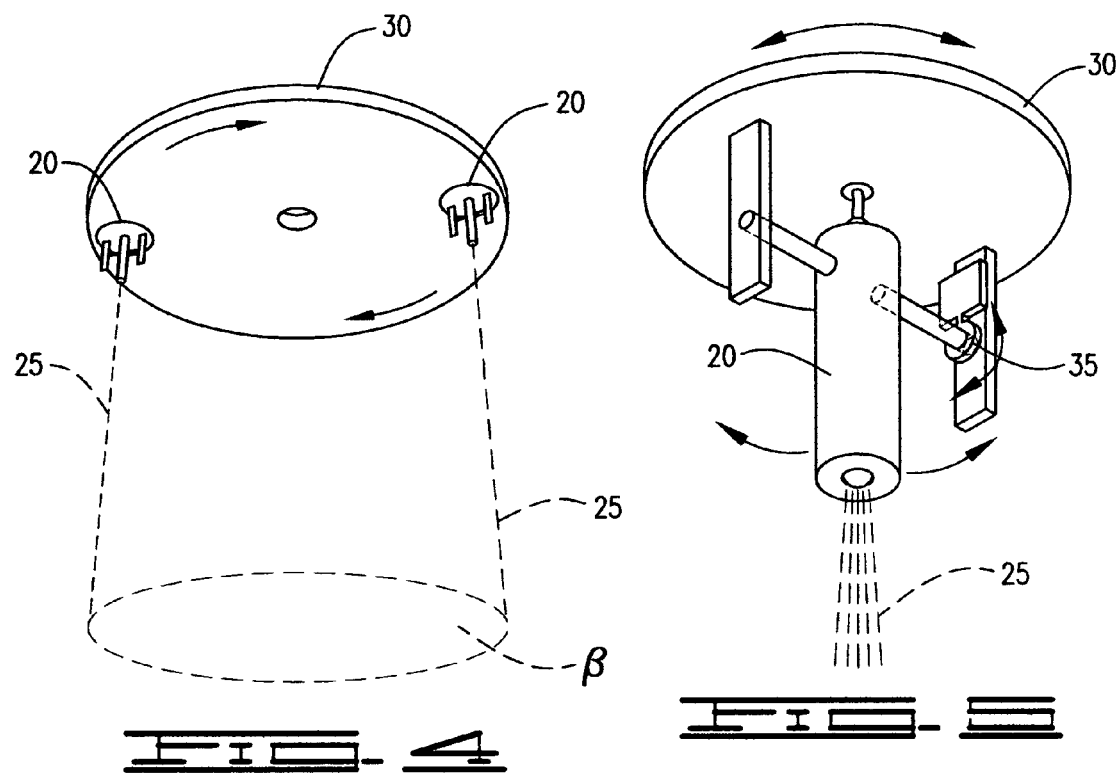
FIG-4
FIG-5
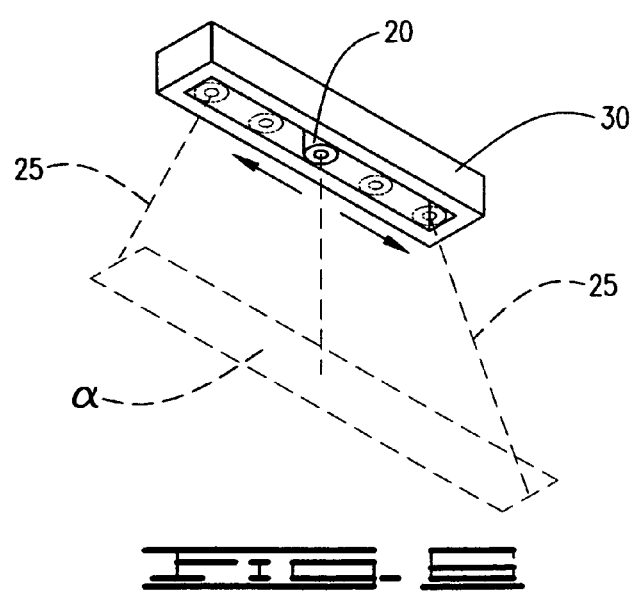
FIG-6

ULTRAVIOLET PLANT ERADICATION APPARATUS AND METHOD

CROSS REFERENCE TO RELATED APPLICATIONS

None.

I. BACKGROUND OF INVENTION

1. Field of the Invention

An ultraviolet laser apparatus dispersing a selected bandwidth of ultraviolet radiation to an area containing specific plants in a pattern, projects the ultraviolet laser radiation into a selected area containing plants to be eradicated, the adjustable bandwidth of ultraviolet radiation determined by the specific bandwidth optimally adapted to disrupt the cellular structure of the selected plant to be exterminated by the ultraviolet radiation, the apparatus being applied to either a ground delivered vehicle or an airborne vehicle.

2. Description of Prior Art

The following United States patents are identified and disclosed herein. Those relative to ultraviolet radiation, though not disclosed as having implications in the filed of plant eradication, include U.S. Pat. No. 6,574,363 to Classen, used to identify pixels of a given color field, U.S. Pat. No. 6,673,067 to Peyman, providing a system and method for thermally and chemically treating cells at sites of interest in the body to impede cell proliferation, and U.S. Pat. No. 5,071,416 to Heller, which discloses a method and apparatus for laser-assisted therapy using an alexandrite laser and a Raman shifter to disperse to different wavelengths to a given target area.

II. SUMMARY OF THE INVENTION

A UV plant eradication system is an integrated system that comprises at least one ultraviolet laser, a power supply and a chiller, where required, a computer system and the platform upon which the UV plant eradication system is mounted. The at least one ultraviolet laser of the UV plant eradication system generates a specific wavelength of ultraviolet radiation upon a laser dispersal platform which broadcasts the laser radiation to an area having at least one plant organism which is to be eradicated.

It has been demonstrated that certain bandwidths of ultraviolet radiation are harmful to the cellular structure of certain specific plants and not others. By identifying the plant to be eradicated and adjusting the bandwidth of the ultraviolet laser to the specific bandwidth most disruptive to the cellular structure of the target plant, the area containing the plant may be irradiated with the bandwidth of ultraviolet radiation produced by the ultraviolet laser may be treated, destroying the selected plant while not destroying the surrounding plants or vegetation.

By example, it would be an objective of the device to determine the bandwidth of ultraviolet radiation best suited to disrupt the cellular structure of a cannabis plant in law enforcement and to covertly utilize the UV plant eradication device, mounted to a low flying aircraft, to destroy the cannabis plant in said area, and deliver no harm to other vegetation. Likewise, law enforcement might be interested in destroying poppy plants, coca plants or other plants from which illegal drugs are produced.

Another example of the intended use of the UV plant eradication device would be to exterminate noxious weeds from a field containing crops by selecting a bandwidth of ultraviolet radiation which would, with the consent of the property owner, destroy the target noxious weeds, yet deliver nominal harm or no harm to the crops being produced in that field.

Other objectives may be accomplished in which plant eradication would be desired. With multiple ultraviolet lasers adjusted to different wavelength outputs or by incorporating a Raman shifter between the ultraviolet laser and the light dispersal mechanism to project more than one wavelength of ultraviolet light into the area, providing for the eradication of more than one selected plant species.

III. DESCRIPTION OF THE DRAWINGS

The following formal drawings are hereby submitted and incorporated into the application to represent an embodiment of the claimed subject matter.

FIG. 3 is a diagram of the general components of the plant eradication system.

FIG. 4 is an embodiment of the delivery platform providing a rotatory pattern of the plant eradication system.

FIG. 5 is an embodiment of the delivery platform providing a reciprocating pattern of the plant eradication system.

FIG. 6 is a view of an adjustable laser source.

IV. DESCRIPTION OF THE PREFERRED EMBODIMENT

Figure 1:
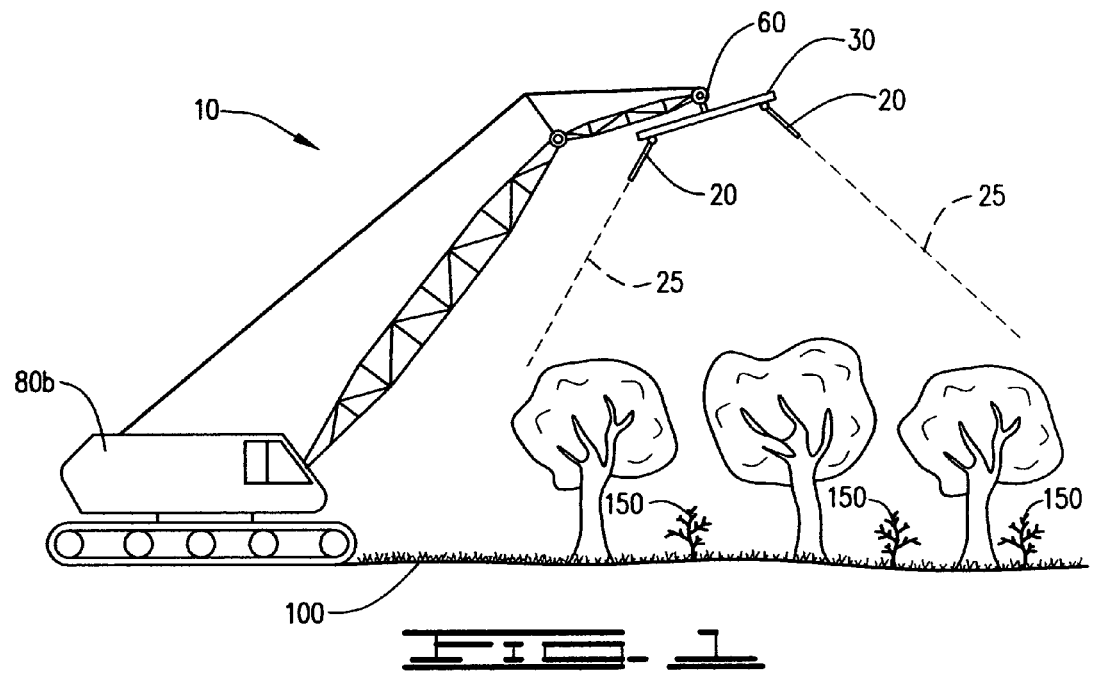
FIG. 1 is a representation of a ground vehicle including the plant eradication system.

An ultraviolet plant eradication system 10, represented in FIGS. 1-6 of the drawing figures, producing a selected bandwidth of ultraviolet laser radiation to a ground target area 100 for the eradication of selected certain specific plants 150 comprises at least one ultraviolet laser source 20 producing an adjustable ultraviolet radiation beam 25 at a wavelength of less than 400 nm but greater than 200 nm, a laser dispersion platform 30, a portable power supply 40, an on-board computer system 50 having installed system hardware, firmware and software for system operation, and a mounting means 60 adapted to a ground or air vehicle 80a, 80b to deliver the ultraviolet radiation beam 25 to the ground target area 100.

More specifically, the at least one ultraviolet laser source 20 emits a selectably adjustable radiation beam 25 principally in the 280 nm-320 nm ultraviolet B range or a radiation beam in the 200 nm-280 nm ultraviolet C range. These spectral wavelengths of ultraviolet radiation have been demonstrate to disrupt the cellular metabolism of certain specific plants 150 to an extent that it causes these plant to die. The rate and timing of exposure may be determined through testing, depending on the certain specific plant, the extent of the growth of the plant and the environmental circumstances of the plant growth. The radiation beam 25 of the at least one ultraviolet laser source 20 should be adjustable to a selected single bandwidth of ultraviolet radiation as determined by the operator of the system.

The laser dispersion platform 30 may be stationary with a moveable ultraviolet laser source 20, providing a reciprocating pattern α, side to side, FIG. 5, which would provide the ultraviolet radiation beam 25 in a linear pathway as the vehicle 80a, 80b travels, the reciprocation pattern α providing a single exposure to each plant below within the ground target area 100. In this embodiment, the reciprocating pattern α may be controlled by varying the reciprocity or cycle of the laser dispersion platform 30 and the at least one laser source 20 to provide the lethal radiation beam 25 to selected certain specific plants 150 in the ground target area 100, amount of exposure also controlled by the speed of the vehicle 80a, 80b.

As another embodiment, the laser dispersion platform 30 may be moveable in a rotating circular pattern β, FIG. 4, with the at least one adjustable ultraviolet laser source 20 in a certain selected position during the treatment, with the circular pattern β providing multiple concentric circular exposures of the ultraviolet radiation beam 25 to each plant below within the ground target area 100. This embodiment would preferably be provided with the ultraviolet laser source 20 having an adjustable means 35 providing adjustment horizontally in a 360 degree radius and vertically in a 180 degree radius, as shown in FIG. 6. This adjustment means 35 could thus direct the ultraviolet radiation beam 25 up and down, side to side or in a vast array of patterns to be adapted to the ground target area 100 being treated and will allow adjustment of the circular pattern β in a tight circle or a wide circle providing one variant to the exposure delivered to the plants being irradiated, with the speed of the circular spin of the laser dispersion platform 30 providing another exposure variant. A targeting sensor may integrate with the on-board computer system 50 to adjust the direction of the radiation beam 35 to the terrain of the ground target area 100 in real time, not shown.

Figure 2:
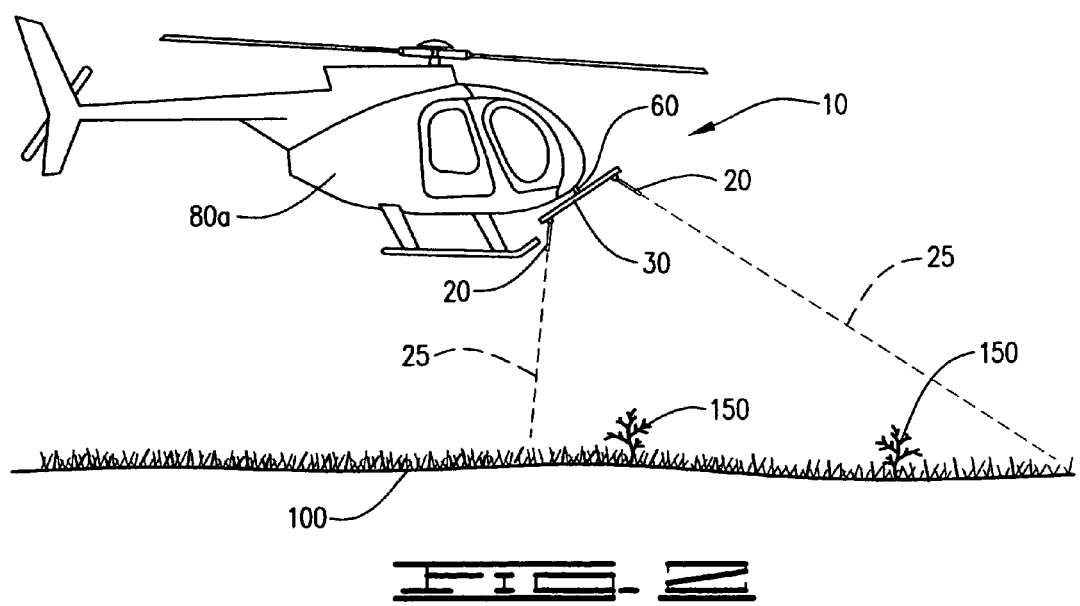
FIG. 2 is a representation of an air vehicle including the plant eradication system.
Figure 2:
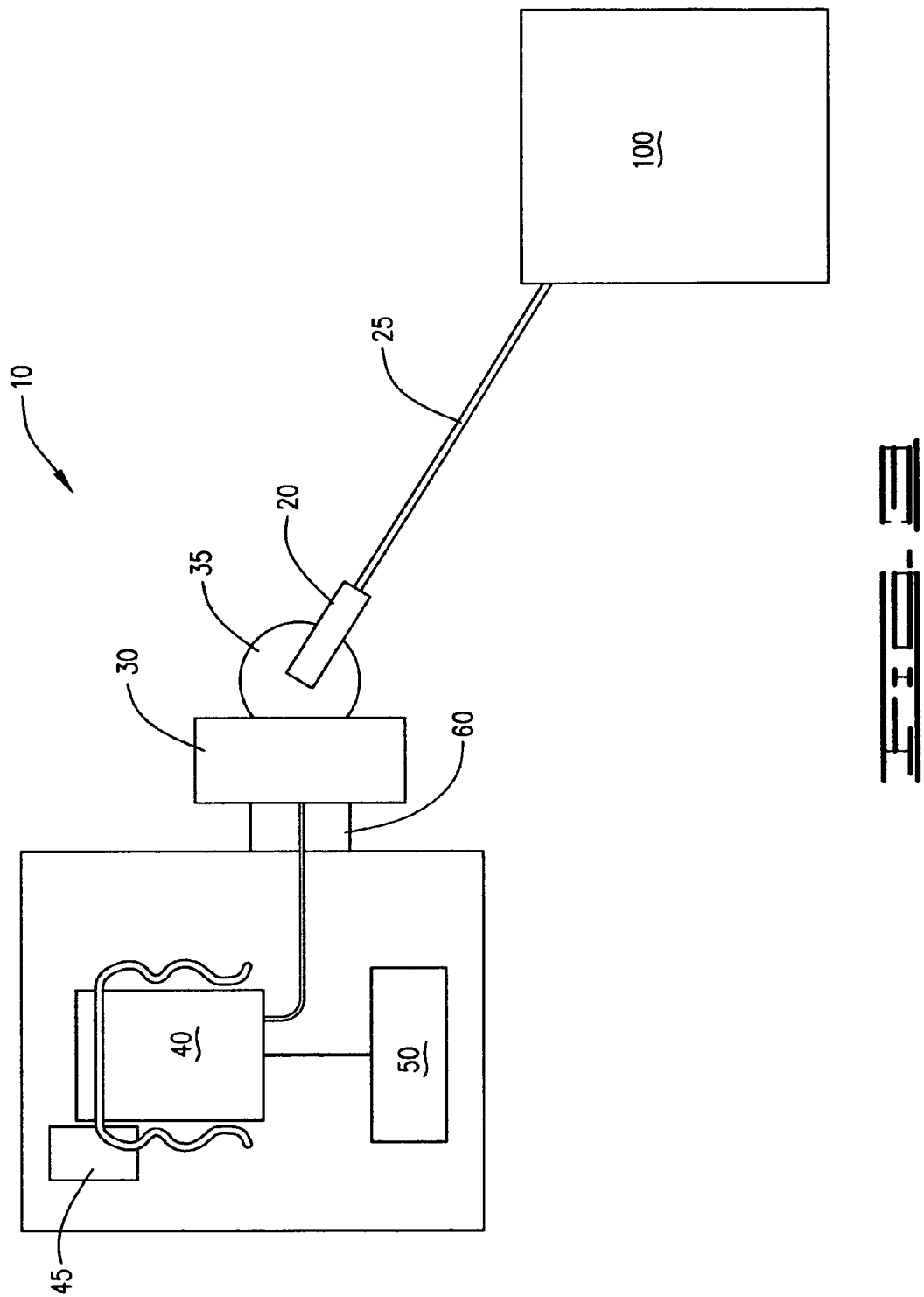

The ultraviolet laser source 20 and laser dispersion platform 30 would be best directed in front of and beneath the air vehicle 80a, as indicated in FIG. 2. The laser dispersion platform 30 should be positioned in front of and above the ground vehicle 80b, FIG. 1, using either stationary or movable laser dispersion platform 30. For covert application of the plant eradication system 10, the ground vehicle 80b would be impractical as it would be difficult to conceal the presence of the ground vehicle 80b as opposed to the air vehicle 80a. The laser dispersal platform 30 and mounting means 60 for the ground vehicle should be placed at a sufficient height to cover a broad target area based upon the speed of the vehicle and also the type of laser dispersion platform 30 used.

The basic components of the plant eradication system 10 would not be different in the ground or air vehicle 80a, 80b. The required components, shown in FIG. 3, may include the portable power supply 40 as a proprietary power supply and with auxiliary chiller cooling hardware 45 to maintain the temperature of the power supply 40. The power supply 40 and auxiliary chiller cooling hardware 45 should be adapted to the laser dispersion platform 30 and the at least one laser source 20, along with the on-board computer 50 and associated system hardware. The system hardware, firmware and software for system operation may be controlled manually or automated, with said system hardware, firmware and software providing system targeting, aiming, reciprocity or cycle, guidance, adjustment of radiation pattern, timed exposure of the at least one laser source 30, laser dispersion platform 30 movement and adjustment dwell and intensity, navigation, system diagnostics associated with the at least one laser source 20, regulation of the power supply 40, operation of the auxiliary chiller cooling hardware 45 and laser dispersion platform 30 components.

In the event more than one certain specific plant 150 is to be eradicated during a single treatment, two or more ultraviolet laser sources 20 may be mounted within the single system, which can produce two or more bandwidths of ultraviolet radiation beams 25 in the ultraviolet-B or ultraviolet-C spectra so that several different certain specific plants 150 may be eradicated in a single treatment. A single ultraviolet laser source 20 may be split into two or more different bandwidths using a Raman shifter within the ultraviolet laser source 30, providing the system 10 so that several different certain specific plants 150 may be eradicated in a single treatment. In addition, a single ultraviolet laser source 20 may be provided which allows for split second shifting of the wavelength to provide a selected array of ultraviolet wavelengths during a single treatment. More than one ultraviolet laser source 20 may also be provided an each laser dispersion platform 30, FIG. 4, with each laser source adjusted to a single ultraviolet bandwidth, or each ultraviolet laser source may be set at a different ultraviolet bandwidth, where two or more certain specific plants are to be eradicated during a single treatment.

As a precautionary warning, animal and human exposure to this ultraviolet laser application is very hazardous and could cause damage to the skin or the eyes. Therefore, caution should be exercise in application of the plant eradication system 10 where humans or other animal life are knowingly present.

Although the embodiments of the ultraviolet plant eradication system 10 have been described and shown above, it will be appreciated by those skilled in the art that numerous modifications may be made therein without departing from the scope of the system 10 as herein described.

We claim:

1. An ultraviolet plant eradication system producing a selected bandwidth of ultraviolet laser radiation to a ground target area for the eradication of certain specific plants comprises:
   at least one ultraviolet laser source producing an adjustable ultraviolet radiation beam at a wavelength of less than 400 nm but greater than 200 nm, adjusted to a selected single bandwidth of ultraviolet radiation selected by the operator of the system based upon the specific spectral wavelength of ultraviolet radiation which disrupts the cellular metabolism of the plant sought to be eradicated by said system;
   a laser dispersion platform upon which is mounted said at least one ultraviolet laser source, said laser dispersion platform delivering said ultraviolet radiation to said ground target area containing said certain species of plants;
   an on-board computer system having installed system hardware, firmware and software for system operation;
   a portable power supply supplying operational power to said at least one laser source, said laser dispersion platform and said on-board computer system; and
   a mounting means adapted to a ground or air vehicle delivering said ultraviolet plant eradication system to said ground target area.

2. The ultraviolet plant eradication system, as disclosed in claim 1, said at least one laser source emitting a selectably adjustable radiation beam principally in the 280 nm-320 nm ultraviolet B range or a laser source emitting radiation in the 200 nm-280 nm ultraviolet C range, which have been demonstrate to disrupt the cellular metabolism of certain specific plants to an extent causing said certain specific plants to die, said radiation beam of said at least one ultraviolet laser source adjustable to a selected single bandwidth of ultraviolet radiation as determined by the operator of system, wherein the rate and timing of exposure to said radiation determined through testing and depending upon the type of certain specific plant, the extent of the growth of said certain specific plant and the environmental circumstances of the certain specific plant growth.

3. The ultraviolet plant eradication system, as disclosed in claim 1, said laser dispersion platform is stationary with said radiation beam of said at least one laser source being moveable in a reciprocating pattern, side to side, providing said radiation beam in a linear pathway as said ground or air vehicle travels, said reciprocating pattern providing a single exposure to each plant below within target area, said reciprocating pattern further controlled by varying a reciprocity or cycle of said at least one laser source within said laser dispersion platform, said laser source providing lethal radiation to only said certain plants in said target area.

4. The ultraviolet plant eradication system, as disclosed in claim 1, laser dispersion platform may be moveable in a rotating circular pattern, with said at least one adjustable laser source in a selected position during use of system, with said rotating circular pattern providing multiple concentric circular exposures of said radiation beam to each plant below within target area said at least one laser source having an adjustable means providing adjustment horizontally in a 360 degree radius and vertically in a 180 degree radius thus directing said at least one laser source up and down, side to side or in a vast array of patterns adapted to said ground area being treated and allowing adjustment of said rotating circular pattern in a tight circle or a wide circle, further providing a variant of radiation exposure delivered to said certain specific plants being irradiated.

5. An ultraviolet plant eradication system producing a selected bandwidth of ultraviolet laser radiation to a ground target area for the eradication of certain species of plants comprises:

at least one ultraviolet laser source producing a selectably adjustable radiation beam principally in the 280 mm-320 nm ultraviolet B range or a laser source emitting radiation in the 200 nm-280 nm ultraviolet C range, which have been demonstrate to disrupt the cellular metabolism of certain specific plants to an extent causing said certain specific plants to die, said radiation beam of said at least one ultraviolet laser source adjustable to a selected single bandwidth of ultraviolet radiation as determined by the operator of system, wherein the rate and timing of exposure to said radiation beam determined through testing and depending upon the type of certain specific plant, the extent of the growth of said certain specific plant and the environmental circumstances of said certain specific plant growth;

a laser dispersion platform upon which is mounted said at least one ultraviolet laser source, said laser dispersion platform delivering said radiation beam to said ground target area containing said certain species of plants;

an on-board computer system having installed system hardware, firmware and software for system operation;

a proprietary power supply including auxiliary chiller cooling hardware to maintain a stable temperature of said proprietary power supply and supplying operational power to said at least one laser source, said laser dispersion platform and said on-board computer system; and a mounting means adapted to a ground or air vehicle delivering said ultraviolet plant eradication system to said ground target area.

6. The ultraviolet plant eradication system, as disclosed in claim 5, said laser dispersion platform is stationary with said at least one laser source being moveable in a reciprocating pattern, side to side, providing said radiation beam in a linear pathway as said ground or air vehicle travels, said reciprocating pattern providing a single exposure to each plant below within said target area, said reciprocating pattern further controlled by varying a reciprocity or cycle of said at least one laser source within said laser dispersion platform, said laser source providing lethal radiation to only said certain specific plants in said target area.

7. The ultraviolet plant eradication system, as disclosed in claim 5, said laser dispersion platform may be moveable in a rotating circular pattern, with said at least one adjustable laser source in a selected position during use of system, with said rotating circular pattern produced by said ultraviolet radiation beam providing multiple concentric circular exposures to each plant below within target area said at least one laser source having an adjustable means providing adjustment horizontally in a 360 degree radius and vertically in a 180 degree radius thus directing said at least one laser source up and down, side to side or in a vast array of patterns adapted to said ground area being treated and allowing adjustment of said rotating circular pattern in a tight circle or a wide circle, further providing a variant of radiation exposure delivered to said certain plants being irradiated.

* * * * *